(12) United States Patent
Sekiguchi et al.

(10) Patent No.: US 7,440,191 B2
(45) Date of Patent: Oct. 21, 2008

(54) METHOD FOR MANUFACTURING CROSS PRISM

(75) Inventors: Takashi Sekiguchi, Tochigi (JP); Kazuo Endo, Tochigi (JP); Katsumi Endo, Tochigi (JP); Shigeru Kato, Tochigi (JP)

(73) Assignee: Fujinon Sano Corporation, Sano-shi (JP)

( * ) Notice: Subject to any disclaimer, the term of this patent is extended or adjusted under 35 U.S.C. 154(b) by 286 days.

(21) Appl. No.: 11/106,431

(22) Filed: Apr. 15, 2005

(65) Prior Publication Data
US 2007/0102097 A1 May 10, 2007

(30) Foreign Application Priority Data
Apr. 27, 2004 (JP) ............................. 2004-130603

(51) Int. Cl.
*G02B 27/12* (2006.01)
*G02B 27/14* (2006.01)
(52) U.S. Cl. ...................... 359/638; 359/640
(58) Field of Classification Search ............... 359/636, 359/638, 640
See application file for complete search history.

(56) References Cited

U.S. PATENT DOCUMENTS

| 3,989,495 | A | * | 11/1976 | Siegmund | 65/31 |
| 5,683,480 | A | * | 11/1997 | Taniguchi | 65/17.2 |
| 6,212,014 | B1 | * | 4/2001 | Lehman et al. | 359/640 |

* cited by examiner

*Primary Examiner*—Alicia M Harrington
(74) *Attorney, Agent, or Firm*—Oblon, Spivak, McClelland, Maier & Neustadt, P.C.

(57) ABSTRACT

For the purpose of depositing deviation-free dichroic coatings of high plane rectitude, there is disclosed a method starting with preparation of glass assembly units each composed of first and second glass members of different lengths. A first dichroic coating 10A is deposited on a lateral side of one glass member, and the other glass member is joined on the first dichroic coating 10A on the one glass member to obtain a glass assembly unit 5. A lateral side of the glass assembly unit 5 is ground to one and same plane at an angle of 90 degrees, and then two edge lines on the opposite side are ground at an angle of 45 degrees to obtain a prism member. A second dichroic coating is deposited on the prism member, and joined with another prism member without a second dichroic coating to obtain a parental cross prism material to be cut into cubes for use as cross prisms.

4 Claims, 8 Drawing Sheets

FIG. 2
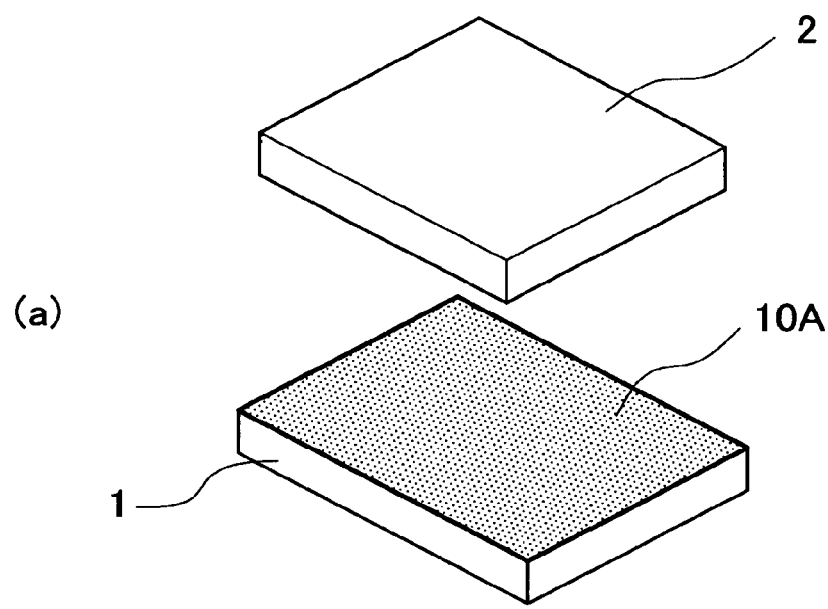
(a)
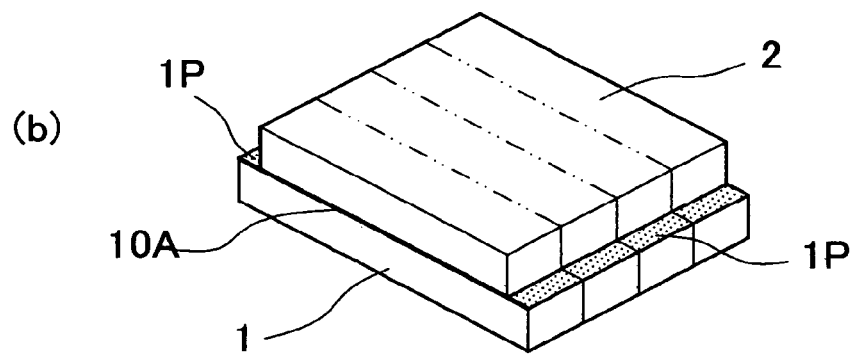
(b)
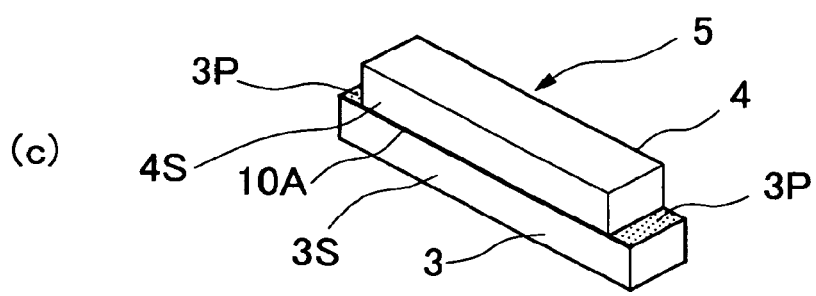
(c)

FIG. 3
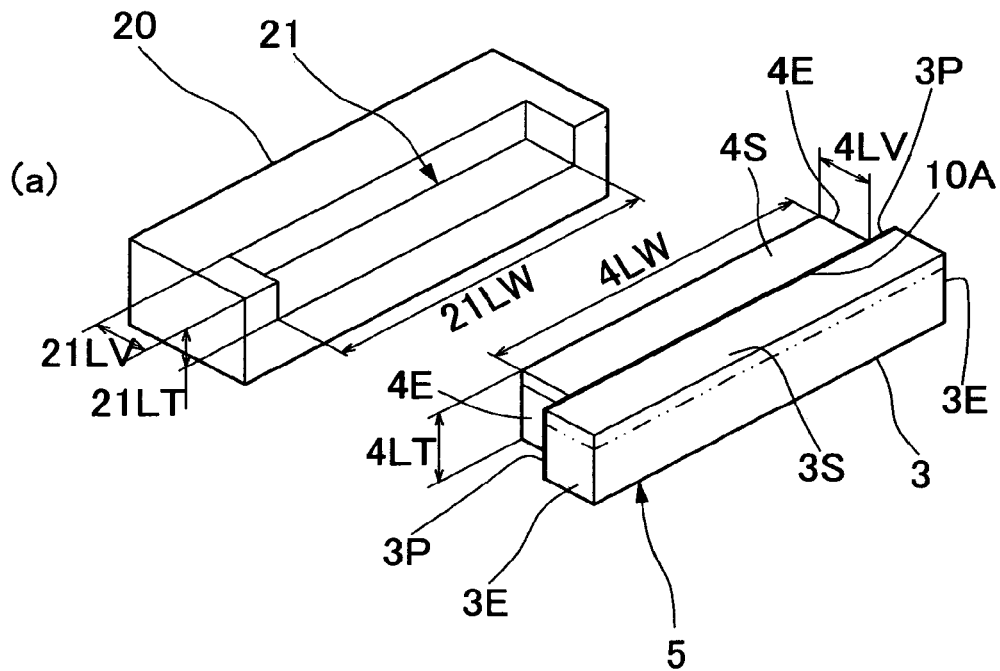
(a)
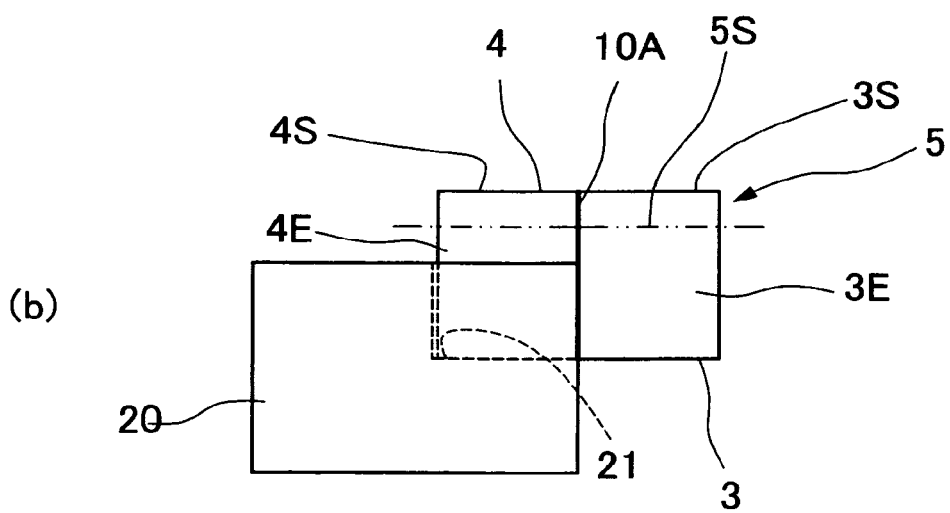
(b)

FIG. 4
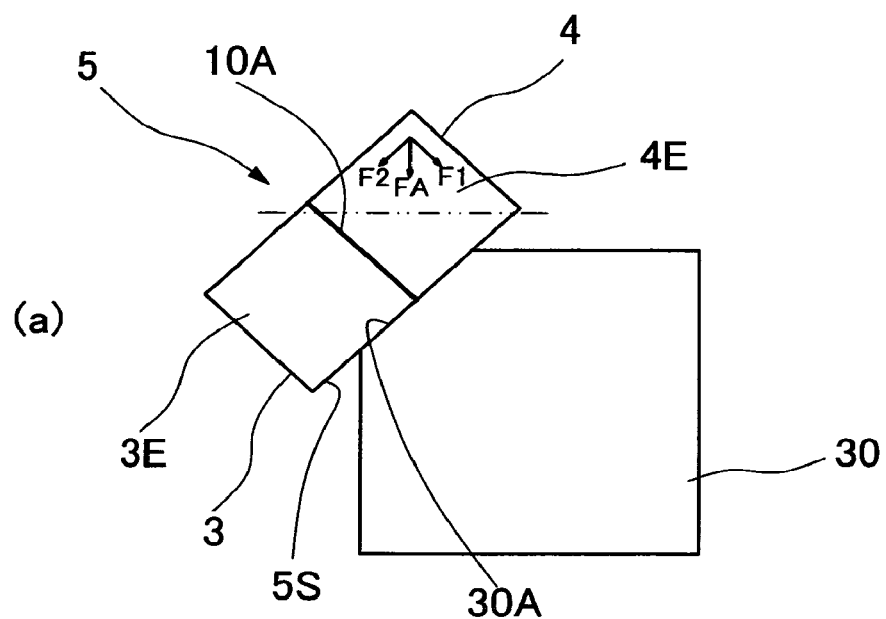
(a)
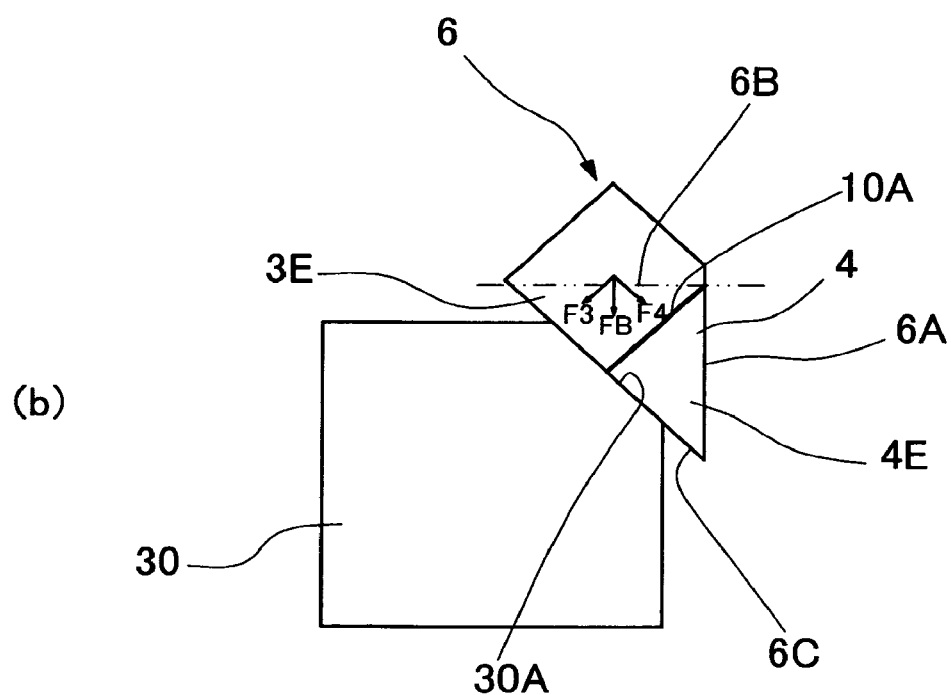
(b)

FIG. 5
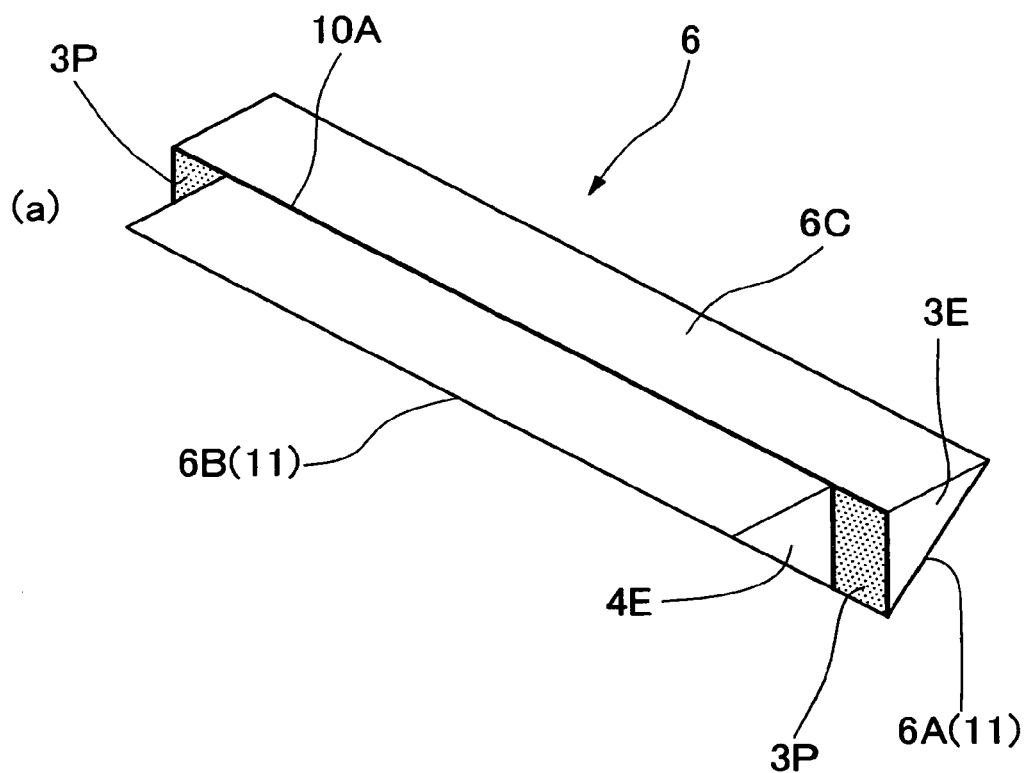
(a)
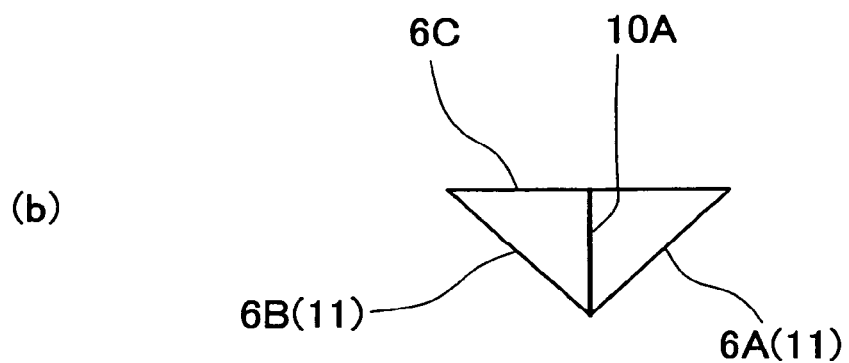
(b)

FIG. 6
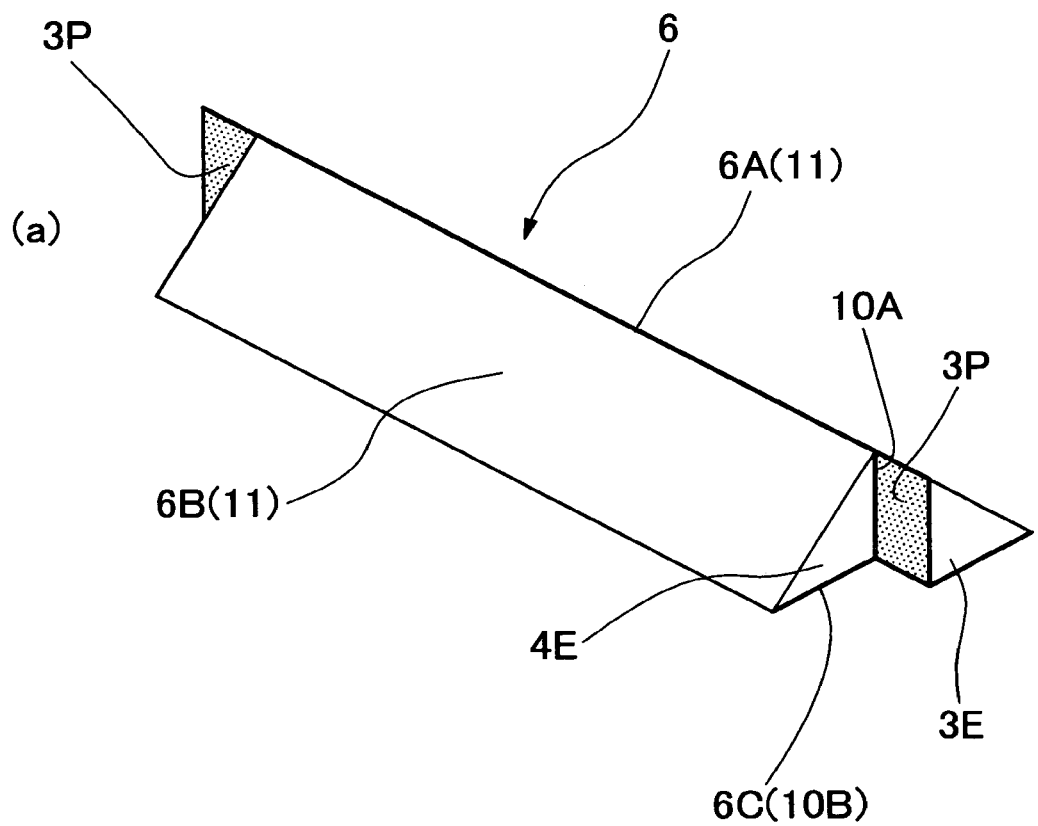
(a)
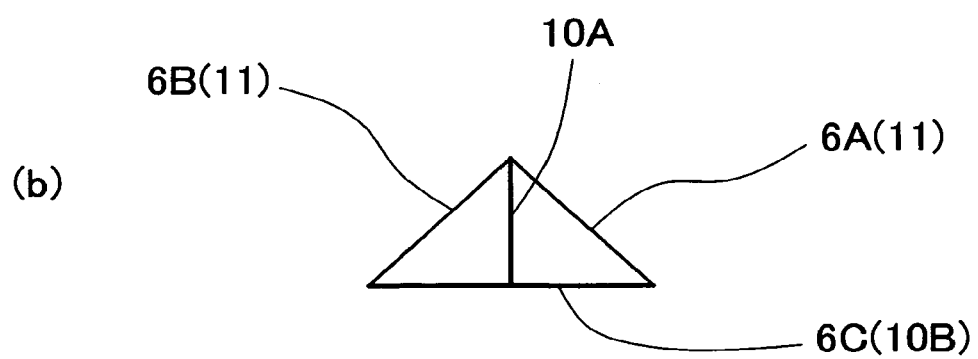
(b)

METHOD FOR MANUFACTURING CROSS PRISM

BACKGROUND OF THE INVENTION

1. Field of the Art

This invention relates to a method for manufacturing cross prisms, and more particularly to a method for manufacturing high precision cross prisms.

2. Prior Art

Cross prisms employing two kinds of optical coatings in crossed relation, more specifically, cross dichroic prisms employing mainly two kinds of dichroic coatings in crossed relation have been in use for separation or synthesis of light of blue, green and red wavelength components. Shown in FIG. 8 is an example of such crossed dichroic prisms. As shown in FIG. 8, a blue wavelength light ray modulated by a blue light modulation light valve 101B, a green wavelength light ray modulated by a green light modulation light valve 101G and a red wavelength ray modulated by a red light modulation light valve 101R are respectively fed to a crossed dichroic prism 100 from three different directions.

The crossed dichroic prism 100 is provided with, in crossed relation, a blue reflecting dichroic coating 104B with properties of reflecting only a blue wavelength component and a red reflecting dichroic coating 104R with properties of reflecting only a red wavelength component. Of the blue, green and red components which are incident on the cross dichroic prism 100, the green component is transmitted through the blue and red dichroic coatings 104B and 104R, while the blue component is reflected off on the blue reflecting dichroic coating 104B and the red component is reflected off on the red reflecting dichroic coating 104R. A color image is synthesized from these transmitted and reflected components and projected on a screen 103 through a projection lens 102.

In order to project color images accurately, the blue reflecting dichroic coatings 104B as well as the red reflecting dichroic coatings 104R of the crossed dichroic prism 100 should be deposited in one and same plane of high rectitude. For example, in the case of the crossed dichroic prism 100 of FIG. 8 which is composed of four triangular prisms 100A, 100B, 100C and 100D, the blue reflecting dichroic coating 104 or the red reflecting dichroic coating 104R is deposited on one of the two inclined sides of the four triangular prisms, prior to cementing the four prisms together. At the time of cementing the four triangular prisms to each other to form the dichroic prism 100, it is a paramount requisite to make sure that apexes of the respective triangular prisms meet together accurately at one point. Deviational errors in cemented apex portions, that is to say, in a center portion of the dichroic prism 100 can result in incorrect or false optical characteristics due to lack of plane rectitude. Especially, deviational errors in center portions of the cemented dichroic prism 100, where components of three colors are synthesized, can have great effects on projected images, giving rise to problems such as unmatched double images, blurring etc.

In this connection, disclosed in Japanese Laid-Open Patent Application 2003-43224 is a method of fabricating a crossed dichroic prism by preparing two sets of cemented glass blocks by joining two glass blocks of different shapes, joining the two cemented glass blocks in optically aligned state by way of sticking-out alignment planes on the two cemented glass blocks to obtain an integrated block structure, and cutting and polishing four corners of the integrated block structure.

More specifically, according to the above-mentioned Japanese Laid-Open Patent Application 2003-43224, first and third rectangular parallelepiped prisms having a square shape in cross section are employed in combination with second and fourth prisms which are longer than the first and third prisms at lateral sides perpendicular to a cross-sectional surface. After polishing the respective prisms, a first dichroic coating is deposited on lateral sides of the first and third prisms. The first and third prisms are temporarily bonded to the second and third prisms, respectively, in such a way as to form a sticking-out reference plane on each one of the first and third prisms. Then, two cemented blocks are formed by curing an adhesive agent, securing plane rectitude of the first dichroic coating with the use of a reference member, and a second dichroic coating is deposited on a lateral side of each cemented block. In the next place, after temporary bondage, the two cemented blocks are adjusted relative to each other by the use of a temporary adhesion reference member such that the sticking-out reference planes are brought to on one and same plane, and the adhesive agent is finally cured to obtain an integrated block structure. A crossed dichroic prism is fabricated out of the integrated block structure by cutting and polishing four ends of the latter.

In the case of the above-mentioned Japanese Laid-Open Patent Application 2003-43224, even if first and second dichroic coatings are deposited on the integrated block structure, there is still a problem that due to concentration of stress distortions occur to center portions of the crossed dichroic prism at the time of cutting and grinding four corners of the integrated block structure in a later stage. Namely, in a cutting stage, forces are applied to the integrated block structure in the cutting direction, including components which are applied in a direction parallel with the bonded surface on which the first dichroic coating is formed, and component which are applied in a direction parallel with the joined plane on which the second dichroic coating is formed. Further, forces are applied toward the center of the integrated block structure in a grinding stage, including components acting in a direction parallel with the joined plane on which the first dichroic coating is deposited, as well as components acting in a direction parallel with the joined plane on which the second dichroic coating is formed.

In this way, at the time of cutting and grinding an integrated block structure, forces are applied not only in a direction parallel with the joined plane on which the first dichroic coating is deposited, but also in a direction parallel with the joined plane on which the second dichroic coating is deposited. Therefore, even if the first and second dichroic coatings are deposited on the integrated block structure satisfactorily in plane of high rectitude, it is likely that they are stressed under the influence of concentration of stress in center portions of the integrated block structure in cutting and polishing stages, and deviations of the dichroic coatings when stressed to an extremely large degree. Especially in a grinding stage, strong forces are applied toward the center of an integrated block structure so that in some case raised portions are developed in center portions of the first and second dichroic coatings, causing a complete breakage to center portions of the dichroic coatings in some cases. As a consequence, it becomes difficult to get correct optical performances in center portions of a crossed dichroic prism which play the most important role.

On the other hand, attempts have been made to cut down the grinding force to a moderate level. However, a moderate grinding process is time consuming and inferior in yield.

SUMMARY OF THE INVENTION

In view of the foregoing situations, it is an object of the present invention to provide a method for manufacturing a cross prism by the use of glass assembly units components of which are joined after grinding to provide a cross prism with planes of high rectitude, free of deviations or irregularities which might be caused in grinding or cutting stages.

In order to achieve the above objective, according to the present invention, there is provided a method for manufacturing a cross prism, which comprises the steps of preparing glass assembly units each comprised of a first glass member in the shape of a narrow square pole and a second glass member similar to said first glass member in cross-sectional shape but shorter than the latter in length, a lateral side of said first glass member being cemented to a lateral side of said second glass member through a first optical coating deposited on a surface of said lateral side of said first glass member or of said second glass member, leaving an alignment reference plane at opposite longitudinal ends of said first glass member;

grinding a lateral side of said glass assembly unit, on the side perpendicular to said optical coating, in preparation of a plane surface on the bottom side of a prism member to be produced; grinding two edge lines of said glass assembly unit on the opposite side from said bottom side to produce a prism member in the shape of an isosceles triangle in cross section to form a first prism member; producing a second prism member by depositing a second optical coating on the bottom side of said first prism member;

joining said first and second prism members by aligning reference surfaces of first glass members in the first and second prism member in such a manner as to form one and same plane to prepare a parent material of cross prism; and cutting said parent material of cross prism with a predetermined length to form a cross prism.

As the first and second optical coatings, a first dichroic coating which mainly transmits light of blue wavelength and a second dichroic coating which mainly transmits light of red wavelength can be provided on the cross prism. However, the optical coatings may be of properties which split light by polarization characteristics.

Preferably, an anti-reflection film is simultaneously on inclined sides on the opposite sides of a right angle ridge of each prism member. Nevertheless, if desired, an anti-reflection film may be separately deposited on each one of inclined sides of a prism member.

The above and other objects, features and advantages of the present invention will become apparent from the following particular description of the invention, taken in conjunction with the accompanying drawings which show by way of example preferred embodiments of the invention. Needless to say, the present invention is not limited to particular embodiments shown in the drawings.

BRIEF DESCRIPTION OF THE DRAWINGS

In the accompanying drawings:

FIG. 2 is a schematic view explanatory of a method of preparing glass assembly units from a first glass substrate and a second glass substrate;

FIG. 3 shows a glass assembly unit and a jig in perspective and front views;

FIG. 4 is a schematic plan view of a glass structure and a jig in a first end face grinding stage and a second end face grinding stage;

FIG. 5 is a view showing in perspective and plan views a prism member in a stage of depositing an anti-reflection coating thereon;

FIG. 6 is a view showing in perspective and plan views a prism member in a stage of depositing a dichroic coating thereon;

DESCRIPTION OF PREFERRED EMBODIMENTS

Figure 1:
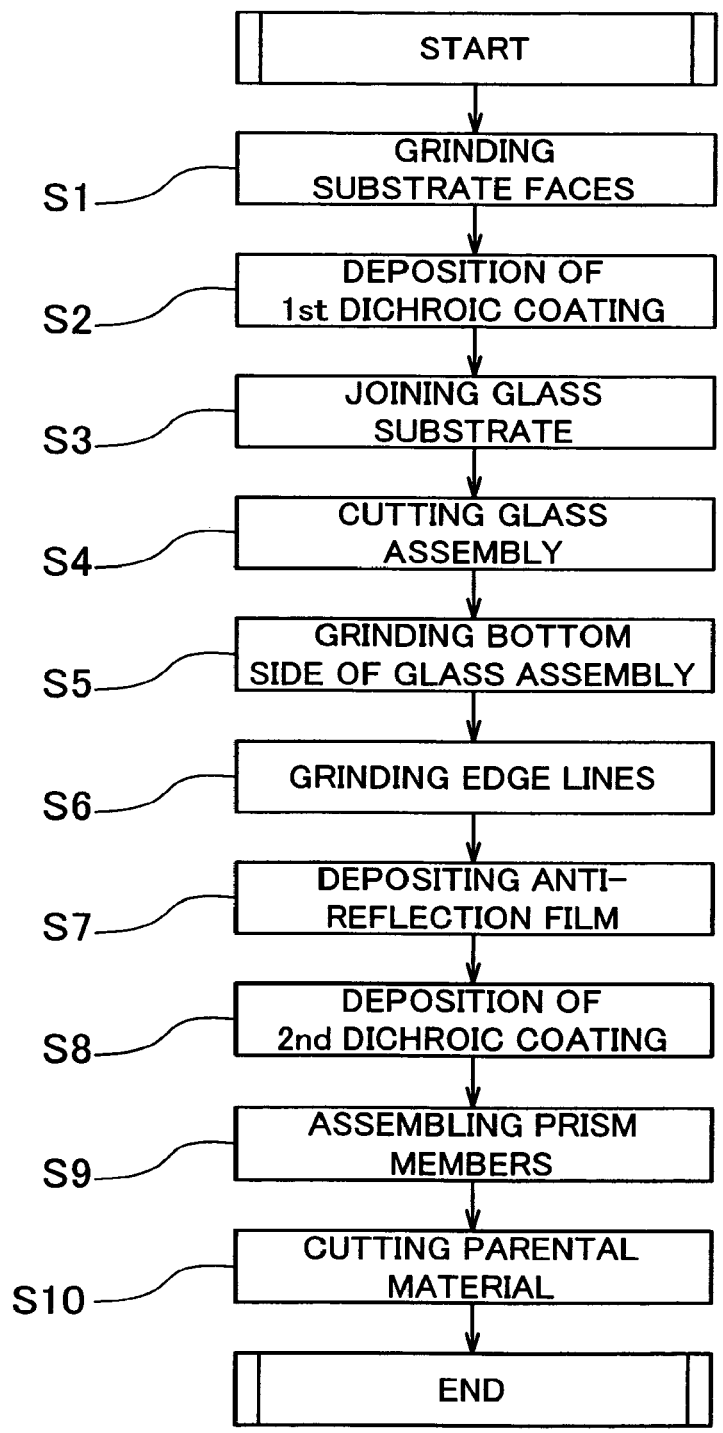
FIG. 1 is a flow chart of a method for manufacturing a crossed dichroic prism according to the present invention.

Hereafter, in the order to steps shown in the flow chart of FIG. 1, the present invention is described more particularly by way of its preferred embodiments. A method of manufacturing a cross prism starts with preparation of a first glass substrate 1 and a second glass substrate 2, both of a flat plate-like shape as shown at (a) of FIG. 2. As seen at (a) of FIG. 2, the first glass substrate 1 is same as the second glass substrate 2 in width but different from the second glass substrate 2 in length. That is to say, the longitudinal sides of the first glass substrate 1 are longer than the corresponding sides of the second glass substrate 2. Further, the first and second glass substrates 1 and 2 are same in thickness. By the use of the first and second glass substrates 1 and 2 which are different in length, reference planes for alignment are provided as described in greater detail hereinafter.

Both end faces of the first and second glass substrates 1 and 2 are ground in a first step (Step S1), and a first dichroic coating 10A is deposited on an end face of either the first or second glass substrate 1 or 2, for example, by vacuum deposition (Step S2). This first dichroic coating 10A is a dichroic coating (hereinafter referred to as "blue dichroic coating) having properties of transmitting light of a wavelength approximately shorter than 500 nm, that is to say, properties of transmitting only blue light, or a dichroic coating (hereinafter referred to as "red dichroic coating") having properties of transmitting light of a wavelength approximately longer than 600 nm, that is to say, properties of transmitting only red light. In the case of the particular embodiment shown, a first dichroic coating 10A is deposited on an end face of the first glass substrate 1. However, if desired, a first dichroic coating 10A may be deposited on an end face of the second glass substrate 2.

Thereafter, as shown at (b) of FIG. 2, the first and second glass substrates 1 and 2 are bonded to each other on the side of the dichroic coating 10A, for example, by the use of an adhesive agent (Step S3), and the assembly of the first and second glass substrates 1 and 2 is cut into narrow strip-like glass assembly units of a predetermined size as shown at (c) of FIG. 2, to obtain glass assembly units 5 (Step S4). In this instance, in a glass assembly unit 5, a glass member originating from the first glass substrate 1 is referred to as a first glass member 3, while a glass member originating from the second glass substrate 2 is referred to as a second glass member 4. Namely, each glass assembly unit 5 is composed of a first glass member 3 which is in the form of a narrow square pole sieth a first dichroic coating 10A, and a second glass member 4 which is similarly in the form of a narrow square pole.

In this instance, since the end faces of the first glass substrate 1 are longer than the end faces of the second glass substrate 2, a 1P free of the second glass substrate 2 is left to stick out from each longitudinal end of the first glass substrate 1 when joined with the second glass substrate 2. Therefore, as shown at (c) of FIG. 2, a plane free of the second glass member 4 (hereinafter referred to as "a reference plane 3P) is projected from each longitudinal end of the first glass member 3. These reference planes 3P serve as reference planes for alignment of two glass assembly units 5 to be bonded together and ground into a triangular prism in a later stage. One reference plane may be provided at one end of the first glass member 3, but it is desirable to provide the reference plane 3P at the opposite ends of the first glass member 3. In case a longitudinal center of the second glass member 4 is registered on a longitudinal center of the first glass member 3, reference planes which are formed at the opposite longitudinal ends of the first glass member 3 are identical with each other in shape and can be easily recognized with eyes. Therefore, preferably each glass assembly unit 5 has a center position of the second glass member registered on a center position of the first glass member 3.

Then, by the use of a jig 20 as shown at (a) and (b) of FIG. 3, a lateral side of the glass assembly unit 5, including a lateral side 3S of the first glass member 3 and a lateral side 4S of the second glass member 4, is ground to one plane for use as a plane on the bottom side 5S of a triangular prism in the shape of an isosceles triangle (Step S5). As seen in perspective and front views at (a) and (b) of FIG. 3, the bottom side 5S is ground to a plane which is disposed at right angles relative to the plane on which the first dichroic coating 10A is deposited, and which contains the lateral sides 3S of the first glass member 3 and the lateral side 4S of the second glass member 4 in one and same plane. Namely, the bottom side 5S, on which a second dichroic coating is to be deposited in a later stage, should be ground in such a way as to maintain one and same plane. It is necessary to grind the lateral sides S3 and S4 of the first and second glass members 3 and 4 into one and same plane, because before grinding the first and second glass members 3 and 4 are not necessarily joined with each other accurately, free of any irregularities between the lateral sides 3S and 4S in terms of plane rectitude.

As shown at (a) of FIG. 3, the jig 20 is provided with a sunken recess 21 to receive the second glass member 4 of the glass assembly unit 5. In a case where the lateral side 4S of the second glass member 4 of the glass assembly unit 5 has a length 4LW and a width 4LV, the glass assembly unit 5 has a thickness 4LT, and the sunken recess 21 has a length 21LW in the longitudinal direction of the second glass member 4, a width 21LV in a crosswise direction and a depth 21LT, the sunken recess 21 should be formed to satisfy the conditions of $21LW \geqq 41W$, $21LV > 4LV$ and $21LT < 4LT$. Namely, in order to fit the second glass member 4 in the sunken recess 21, the length 21LW of the sunken recess 21 should be longer than the length 4LW of the second glass member 4. In a grinding stage, the second glass member 21 of the glass assembly unit 6 needs to be fixed in the sunken recess 21 by the use of an adhesive to prohibit movements of the glass assembly unit 5 in the longitudinal direction. Taking into account a grinding margin for the bottom side 5S of the glass assembly unit 5, the thickness 4LT of the second glass member 4 of the glass assembly unit 21 should be larger than the depth 21LT of the sunken recess 21. On the other hand, the sunken recess 21 is formed in a width 21LV in crosswise direction, which is larger than the width 4LV of the lateral side 4S of the second glass member 4.

In this instance, the jig 20 is arranged to hold only the second glass member 4 of the glass assembly unit 5. In this regard, it is conceivable to change the shape of the sunken recess 21 in such a way as to hold also the first glass member 3. However, before grinding a lateral side of the glass assembly unit 5 in Step S5, there may be a deviation in planeness between lateral sides of the first and second glass members 3 and 4 as mentioned hereinbefore. In case a misalignment in planeness exists between the first and second glass members 3 and 4, only one of the two glass members may be held in contact with the sunken recess 21 while the other one is in a floated state out of contact with the sunken recess 21. If the glass assembly unit 5 were retained in an inclined state on the jig 21, it would become difficult to grind the glass assembly unit 5 accurately in a subsequent grinding stage. For this reason, it is desirable for the jig 20 to be arranged to hold only the second glass member 4 in its sunken recess 21 during the grinding operation in S5.

After fitting the second glass member 4 in the sunken recess 21 of the jig 20 as described above, the bottom side 5S of the glass assembly unit 5 is ground to a plane which is disposed at the angle of 90 degrees relative to the first dichroic coating 10A. At this time, the glass assembly unit 5 is ground down to the position which is indicated by a one-dot chain line in at (b) of FIG. 3. Preferably, the glass assembly unit 5 is ground until the end faces 3E and 4E of the first and second glass members 3 and 4 become square.

Then, the ground bottom side 5S of the glass assembly unit 5 is fixedly bonded on a jig 30 as shown at (a) of FIG. 4 by the use of an adhesive agent. This jig 30 is in the shape of a square pole which is truncated along one edge line to provide an inclined plane 30A. The inclined plane 30A is disposed at the angle of 45 degrees relative to adjoining surfaces, and the bottom side 5S of the glass assembly unit 5 is fixedly bonded on this inclined surface 30A. One of edge lines on the side away from the bonded bottom side 5S is ground to a plane which is disposed at the angle of 45 degrees relative to the first dichroic coating 10A. Then, after turning the jig 30 clockwise through 90 degrees, the other edge line is ground to a plane which is also disposed at the angle of 45 degrees relative to the first dichroic coating 10A (Step S6). At this time, the grinding operation may be started from an edge, but it is more efficient to start grinding after cutting off the edge by the use of a cutter or other machining means. As indicated by a one-dot chain line at (a) and (b) of FIG. 4, the grinding operation is carried out up to or beyond an end of the ground bottom side 5S.

In this instance, at the time of edge grinding in Step S6, the greatest load is imposed on the glass assembly unit 5 in a grinding direction, that is, the largest force is applied in the direction of arrows FA and FB as indicated at (a) and (b) of FIG. 4. The force FA which is applied to the glass assembly unit 5 at the time of the grinding operation in Step S6 can be divided into two components F1 and F2. At this time, the component F1 can be offset because it acts in a direction perpendicular to the inclined plane 30A of the jig 30. On the other hand, the component F2 acts in a direction parallel with the inclined plane 30A of the jig 30, so that it tends to shift the glass assembly unit 5 as a whole in the direction of F2 but has no influence whatsoever on the plane on which the first dichroic coating 10A is deposited. Namely, a problem here would be the force which acts between the first and second glass members 3 and 4 in the direction of F1, because the force in the direction of F1 might cause a deviation between the first and second glass members 3 and 4. Should a deviation occur between the first and second glass members 3 and 4, it would become necessary to grind the bottom side 5S of the glass assembly unit 5 again to maintain one and same planeness between the first and second glass members 3 and 4, despite the planeness which was once established by the grinding operation in Step S5. However, the problem of this sort can be disregarded because a force in the direction of F1 is offset by the jig 30. Similarly, a force FB which is applied in the grinding operation as shown at (b) of FIG. 4 can be decomposed into components F3 and F4. These components of the grinding force has no possibility of posing adverse effects on a cross prism to be fabricated, since the component in the direction of F3 is offset by the jig 30 and the component in the direction of F4 is utterly unlikely to cause deviations to the dichroic coating.

Shown in perspective and plan views at (a) and (b) of FIG. 5 is a narrow prism member 6 in the shape of an isosceles triangle in cross section, which is obtained at the end of the grinding operation in Step S6. Except the bottom side 5S, an anti-reflection film is coated on inclined sides 6A and 6B of the prism member 6 (Step S7) to secure higher optical properties or characteristics. In this connection, an anti-reflection film 11 may be coated separately on the inclined sides 6A and 6B, but it is desirable to coat an anti-reflection film 11 simultaneously on the surfaces of the inclined sides 6A and 6B. More specifically, while holding opposite end faces of the prism member 6 over a vaporization source, which is not shown in the drawing, vapors of an anti-reflection material from the vaporization source (anti-reflection films 11) are deposited on surfaces of the inclined sides 6A and 6B. By so doing, an anti-reflection film 11 can be deposited on both surfaces of the inclined sides 6a and 6B all at once. In the case of an evaporation apparatus of this sort, normally the anti-reflection film 11 is deposited on the prism member 6 which is located over a vaporization source. At this time, a right angle ridge between the inclined sides 6A and 6B of the prism member 6 is located in such a way as to confront a vaporization source which is not shown. An evaporated substance (the anti-reflection film 11) is deposited on surfaces of the inclined sides 6A and 6B in a thickness which is greatest in the vicinity of the above-mentioned common side and which diminishes gradually in a direction away from the common side. On the other hand, the anti-reflection film 11 has to be coated in uniform thickness on surfaces of the inclined sides 6A and 6B. For example, the above-mentioned problem can be solved by coating an anti-reflection film 11 with properties of absorbing deviations in wavelength. Namely, the anti-reflection film 11 is coated in such a way that the properties of the anti-reflection film 11 will not be influenced by certain shifts in wavelength toward a longer wave side or toward a shorter wave side.

As shown in perspective and plan views at (a) and (b) of FIG. 6, in the next step a second dichroic coating 10B is then deposited on the bottom side 6C of the prism member 6 (Step S8), which has the anti-reflection film 11 on its inclined sides 6A and 6B. The second dichroic coating 10B is either a blue dichroic coating or a red dichroic coating which is different from the first dichroic coating 10A. Since the bottom side 6C of the prism member 6 has already been ground to one and same planeness in Step S5, the dichroic coating 10B can be deposited free of deviations and with satisfactory continuity. In forming the second dichroic coating 10B, the prism member 6 is located over a vaporization source for the second dichroic coating 10B, which is not shown, holding opposite ends of the prism member 6 in such a way that its bottom side 6C confronts face to face with the vaporization source.

Figure 7:
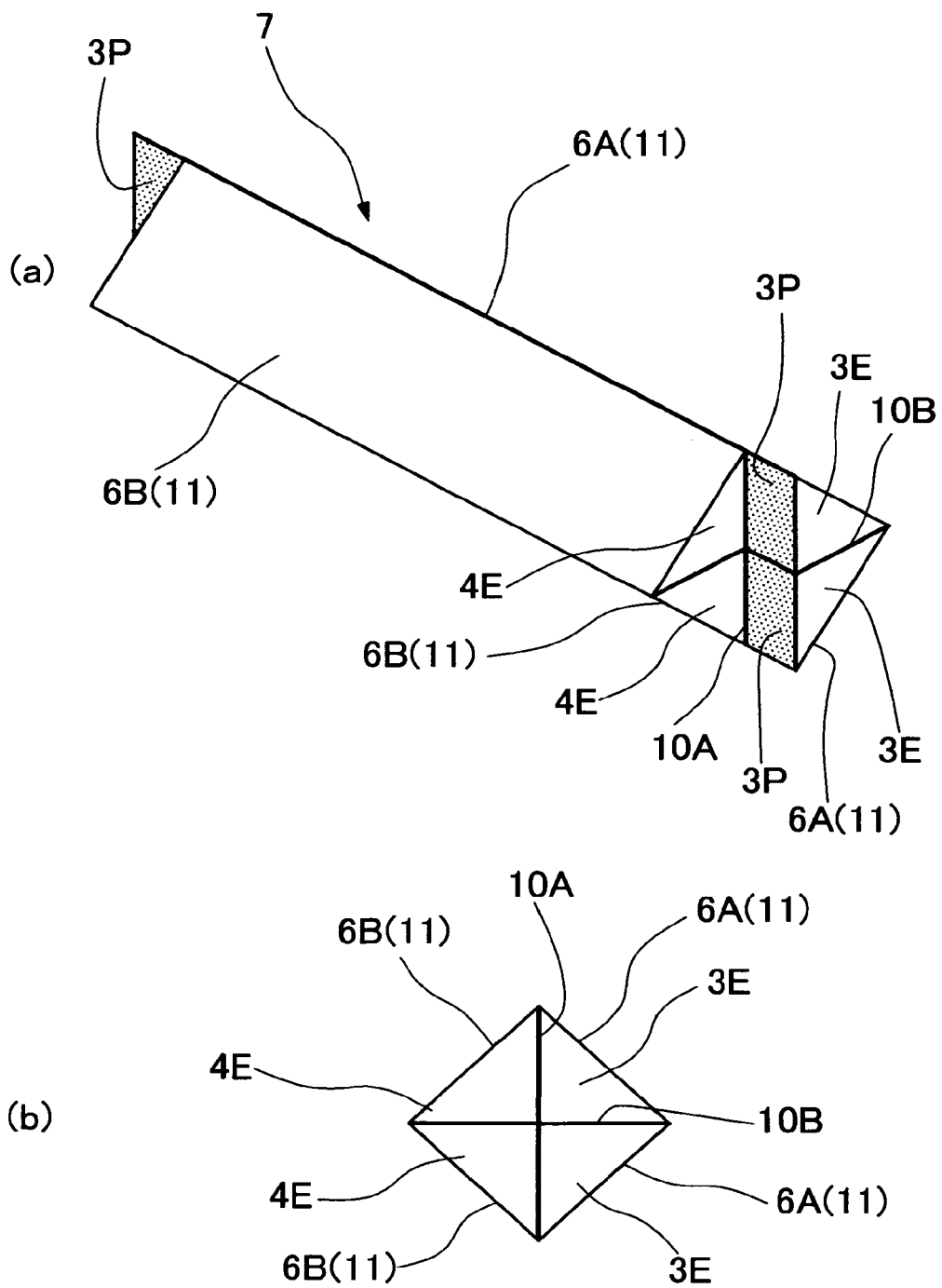
FIG. 7 is a view showing a parental material of cross prisms in perspective and plan views.
Figure 8:
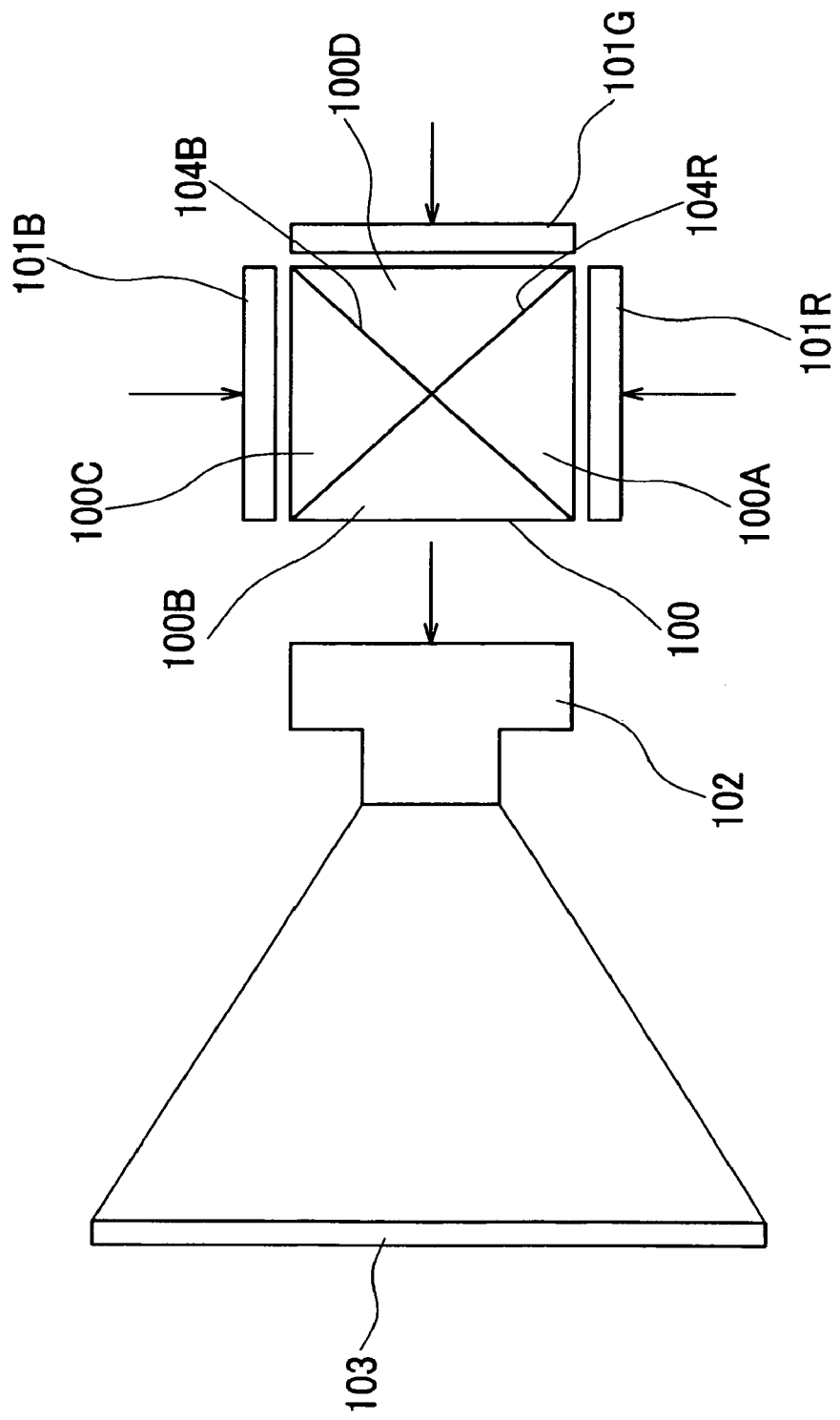
FIG. 8 is a schematic view of part of a projection type display.

Then, as shown in perspective and plan views at (a) and (b) of FIG. 7, two prism members 6, one with the second dichroic coating 10B on its bottom side 6C and the other one without any dichroic coating on its bottom side 6C, are bonded together bottom to bottom to obtain a parental material of cross prisms (Step S9). At this time, the two prism members 6 are joined together in such a way that the alignment reference planes 3P of the two prism members 6 are aligned to make accurately one and same plane. For this purpose, for example, firstly the two prism members 6 are temporarily bonded to each other, aligning the reference planes 3P into one plane, and then actually bonding the two prism members together after fine adjustments bringing the reference planes 3P accurately into one plane. By bringing the reference planes 3P accurately into one plane at the time of joining the two prism members 6 together, the second dichroic coating 10B is 11 located in one plane free of deviations. Further, since the second dichroic coating 10B is deposited on a bottom side of one prism member 6, which is ground to one plane in Step S5, it can be located in one plane free of deviations.

Cross prisms of ultimate products are obtained by cutting the cross prism parental material 7 into regular hexahedrons, cubes or dices. Namely, the parental material 7 of cross prism is cut into the shape of a cross prism of ultimate product.

Thus, on a cross prism of ultimate product, each one of the first and second dichroic coatings 10A and 10B is deposited in one plane free of deviations, through the steps as explained above. Especially, a bottom side 5S of a glass assembly unit 5 is ground accurately to form an angle of 90 degrees in Step S5, so that a ridge on the opposite side from the bottom side 5S can be ground to a plane in Step S6 without applying a force which would cause deviations to the first dichroic coating 10A. Thus, the method according to the present invention makes it possible to manufacture a cross prism with each one of first and second dichroic coatings 10A and 10 accurately in one plane.

Namely, the method of the present invention makes it possible to manufacture high precision cross prisms having each one of dichroic coatings accurately in one plane.

What is claimed is:

1. A method for manufacturing a cross prism, comprising the steps of:

preparing glass assembly units each comprised of a first glass member in the shape of a narrow square pole and a second glass member similar to said first glass member in cross-sectional shape but shorter than the latter in length, a lateral side of said first glass member being cemented to a lateral side of said second glass member through a first optical coating deposited on a surface of said lateral side of said first glass member or of said second glass member, leaving an alignment reference plane at opposite longitudinal ends of said first glass member;

grinding a lateral side of said glass assembly unit, on the side perpendicular to said optical coating, in preparation of a plane surface on the bottom side of a prism member to be produced;

grinding two edge lines of said glass assembly unit on the opposite side from said bottom side to produce a prism member in the shape of an isosceles triangle in cross section to form a first prism member;

producing a second prism member by depositing a second optical coating on the bottom side of a prism member in the same shape of said first prism member;

joining said first and second prism members by aligning reference surfaces of first glass members in the first and second prism member in such a manner as to form one and same plane to prepare a parent material of cross prism; and cutting said parent material of cross prism with a predetermined length to form a cross prism.

2. A method for manufacturing a cross prism as defined in claim 1, wherein said second glass member of each glass assembly unit is joined with said first glass member to leave sticking-out reference planes at opposite longitudinal ends of said first glass member.

3. A method for manufacturing a cross prism as defined in claim 1, further comprising the step of depositing an anti-reflection film simultaneously on two inclined sides of each prism member, before or after deposition of said second optical coating.

4. A method for manufacturing a cross prism comprising the steps of:
- grinding end faces of a first glass substrate of a rectangular shape and a second glass substrate being same as said first glass substrate in width but shorter than the latter in length;
- depositing an optical coating on either a ground end face of said first glass substrate or a ground face of said second glass substrate;
- joining one glass substrate opposing said optical coating to the other glass substrate;
- cutting a resulting glass substrate assembly into glass assembly units of a narrow strip-like shape;
- grinding a lateral side of said glass assembly unit, on the side perpendicular to said optical coating, in preparation of a plane surface on the bottom side of a prism member to be produced;
- grinding two edge lines of said glass assembly unit on the opposite side from said bottom side to produce a prism member in the shape of an isosceles triangle in cross section to form a first prism member;
- producing a second prism member by depositing a second optical coating on the bottom side of a prism member in the same shape of said first prism member;
- joining said first and second prism members by aligning reference surfaces of first glass members in the first and second prism member in such a manner as to form one and same plane to prepare a parent material of cross prism; and
- cutting said parent material of cross prism with a predetermined length to form a cross prism.

* * * * *